Oct. 23, 1934. C. KAUFMAN Re. 19,348

SCREW AND BOLT AND PROCESS OF MAKING THE SAME

Original Filed Feb. 3, 1930

INVENTOR

Charles Kaufman by his Atty.

Byrns, Stilkins & Blenko

Reissued Oct. 23, 1934

Re. 19,348

UNITED STATES PATENT OFFICE 19,348

SCREW AND BOLT AND PROCESS OF MAKING THE SAME

Charles Kaufman, Garfield Heights, Ohio, assignor to Pittsburgh Screw and Bolt Corporation, Pittsburgh, Pa.

Original No. 1,803,803, dated May 5, 1931, Serial No. 425,408, February 3, 1930. Application for reissue September 10, 1934, Serial No. 743,461

9 Claims. (Cl. 10—27)

This invention relates to bolts and screws and a process of making the same, and in the latter aspect is concerned particularly with a process of forming such articles by drawing up and heading lengths of preferably round stock. In some of its aspects the present invention is an improvement over the process described in my Letters Patent No. 1,617,122, dated February 8, 1927.

In the heading of bolt and screw blanks by the upsetting process, it has been the practice usually, that is prior to the invention of the above mentioned patent, to form the head by working it up in a series of upsetting steps from wire of the pitch diameter of the threaded portion of the article. Usually a sort of collar is formed upon the stock at a position spaced from one end thereof and thereafter the stock beyond the collar is compressed and expanded radially by another upsetting operation. When this is done the metal of these two parts of the head does not flow together and become an entirely homogeneous whole, as it should do if the head is to have maximum strength. On the contrary the stock beyond the collar is folded down, as it were, against the collar, leaving an annular joint which marks a cleavage plane whenever the head is subjected to heavy strains. Furthermore the strains in the metal of the head caused by upsetting increase as the degree of enlargement increases.

Accordingly it is an object of the present invention to reduce the liability of fracture in the upset heads of bolts and screws by eliminating any foliated structure therein and by decreasing heading strains.

In accordance with the method of the present invention the stock is subjected to two drawing operations to reduce the diameter first to the overall diameter of the threads of the finished article, and second to reduce the major part of the first reduced portion to the pitch diameter of the threads, these reducing operations having a beneficial effect upon the molecular structure of the metal affected. I term this last-mentioned portion the "stem". Then the unreduced portion of the stock is upset to form the head of the article, although I prefer to perform this upsetting operation simultaneously with one of the drawing operations, preferably the last one. There is but one upsetting blow necessary, inasmuch as the original stock is of a diameter greater than the diameter of the shank of the article. The head being thus upset, it is trimmed to square or hexagonal shape, and the article is then ready for threading.

The present invention differs from that of the patent above referred to in that it starts with a diameter of stock greater than the overall diameter of the threads of the finished article, while in the patented process the stock is of the same diameter as the overall diameter of the threads. In the patented process there is but one drawing operation necessary, but the upsetting requires two blows. Hence the number of operations in the present process is not increased over those employed in my patented process, and the present process employs more reduction than upsetting, which, as before stated, is of advantage in its action upon the metal structure, thereby resulting in a stronger article.

In the accompanying drawing, wherein I have illustrated one embodiment of the invention for the purposes of the present application, Figs. 1 and 2 are side and end elevations of a length of stock constituting the material with which the process begins.

Figure 2:
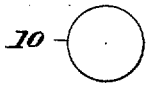
Figure 1:
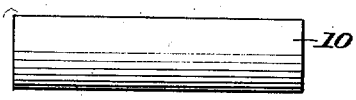
Figure 4:
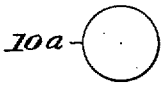
Figs. 3 and 4 are similar views after the first drawing operation.
Figure 3:
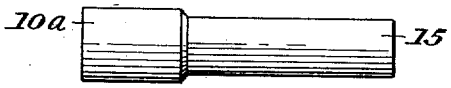
Figure 6:
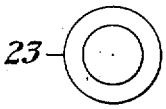
Figs. 5 and 6 are similar views after the second operation, wherein the upsetting of the head is performed simultaneously with the final drawing of the shank.

The present invention may be used advantageously in forming practically all kinds of screws and bolts without regard to the shape of the heads thereof. In carrying out the invention I employ round wire stock of indefinite length, which is cut by suitable means to a predetermined length 10, as indicated in Fig. 1. This length of stock 10 is then fed into a cold heading machine of any suitable design, being caused to enter an opening 11 in a die 12, this opening being of the same or substantially the same diameter as the stock 10. Aligned and communicating with the opening 11 in the die is a further opening 13 of smaller diameter. The hammer 14 of the machine forces the stock into the opening 13, drawing down the major portion of the stock to a diameter 15, and thereby also lengthening the article somewhat. The blank is now in the condition illustrated in Fig. 3, where the portion 10*a* is of the same diameter as original stock 10.

The blank is next fed into another cold heading machine, or into other dies in the same machine, and the reduced diameter portion 15 is caused to enter an opening 16 in a die 17, this opening being of the same or substantially the same diameter as the portion 15 of the blank. Communicating with the opening 16 is an aligned opening 18 of reduced diameter. The opening 16 also communicates with an enlarged opening 19, which registers substantially with a socket or opening 20 in a hammer 21 which cooperates with the die 17. When the hammer 21 strikes, the greater part of the portion 15 of the blank is caused to enter the opening 18, and is thereby drawn down to a diameter 22. A part of the portion 15 however is unaffected, and remains as the portion 15*a*, shown in Fig. 5. At the same time that this second reduction is taking place the portion 10*a* of the blank is being upset to fill the openings 19 and 20, resulting in a head 23.

Figure 9:
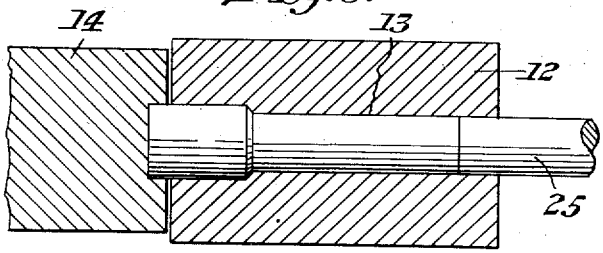
Fig. 9 is a cross sectional view showing the die and hammer employed for the first drawing operation, with a length of material in the position and form which it assumes at the end of the hammer stroke.
Figure 10:
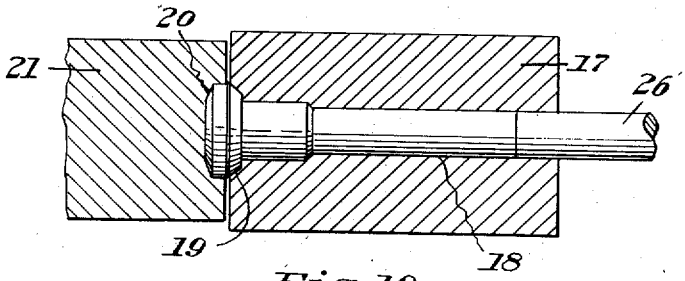
Fig. 10 is a view similar to Fig. 9, showing the corresponding parts at the end of the second or combined upsetting and drawing operation.

Rods 25 and 26, shown in Figs. 9 and 10, are ejectors which may be employed for stripping the blank from the dies 12 and 17 respectively after the hammers have struck and receded.

Figure 5:
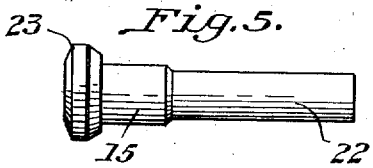
Figure 8:
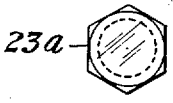
Figs. 7 and 8 are similar views of the completed article, that is after it is threaded and the head is trimmed.
Figure 7:
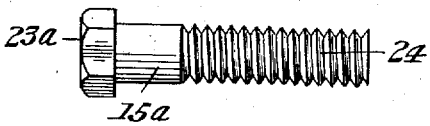

When the blank is finished to the extent illustrated in Fig. 5, it then remains to trim the head 23 to the desired form such, for instance, as the hex 23*a* illustrated in Figs. 7 and 8, and to roll or otherwise form the threads 24 in the portion 22 of the blank.

The parts 10 and 10*a* are of the same diameter, the parts 15 and 15*a* are also of the same diameter, and the part 22 is of the pitch diameter of the screw threads 24. The reduction of original stock by drawing down to the diameters 15 and 22, serves to compact and harden the metal, particularly that near the surface. The increase in diameter of the head 23 over that of stock 10 or 12*a* is one of relatively small degree, and may be performed by a single blow, thus removing entirely any possibility of foliated structure, and lessening the danger of fracture due to heading strains in the metal.

While in the foregoing description and in the accompanying drawing I have disclosed my method in considerable detail, I desire it to be understood that such detail disclosure has been resorted to primarily for the purpose of fully illustrating the invention in conformity with the requirements of the statute, and is not to be construed as amounting to a limitation upon the scope thereof.

Having thus described my invention, I claim:

1. The method of making bolt and screw blanks which comprises drawing a portion of a length of stock of cross-sectional area greater than that of the shank of the blank to form a round cross section of a diameter equal to the overall diameter of the threads of the finished article, drawing down a portion of said round cross section to a diameter equal to the pitch diameter of the threads, and upsetting the unreduced portion of the stock to form a head.

2. The method of making bolt and screw blanks which comprises drawing a portion of a length of stock of cross-sectional area greater than that of the shank of the blank to form a round cross section of a diameter equal to the overall diameter of the threads of the finished article, drawing down a portion of said round cross section to a diameter equal to the pitch diameter of the threads, upsetting the unreduced portion of the stock to form a head, and trimming said head.

3. The method of making bolt and screw blanks, which comprises drawing a portion of a length of stock of cross-sectional area greater than that of the shank of the blank to form a round cross section of a diameter equal to the overall diameter of the threads of the finished article, and in a single further operation drawing down a portion of said reduced section still further to a diameter equal to the pitch diameter of the thread, and at the same time upsetting the unreduced portion of the stock to form a head.

4. The method of making bolt and screw blanks, which comprises reducing step by step by means of a plurality of drawing operations a portion of a length of stock of cross-sectional area greater than that of the shank of the blank until the desired minimum diameter of the blank is reached, and upsetting the unreduced portion of stock to form a head.

5. The method of making bolts and screws which comprises drawing a portion of a length of stock of cross sectional area greater than that of the shank of the article to form a round cross section of a diameter equal to the overall diameter of the threads of the finished article, drawing down a portion of said round cross section to form a stem having a diameter equal to the pitch diameter of the threads, upsetting the unreduced portion of the stock to form a head, and rolling threads on the stem.

6. The method of making bolts and screws which comprises reducing in a step-by-step manner by means of a plurality of drawing operations a portion of a length of stock of cross sectional area greater than that of the shank of the article until the desired minimum diameter of the blank is reached, upsetting the unreduced portion of stock to form a head, and rolling threads on the portion of the blank of minimum diameter.

7. As a new manufacture, a blank for the making of bolts and screws comprising a shank, a stem of reduced diameter, and a head, characterized by having a structure of the sort obtainable by drawing down to the shank diameter stock of smaller cross sectional area than the head but larger than the shank, a portion of the stock in the blank remaining undrawn, further drawing down a portion of the first-mentioned drawn portion to form the stem, and upsetting the undrawn portion of the blank to form the head.

8. As a new manufacture, a threaded article comprising a head, a shank and a threaded stem having a metallurgical structure of the character obtainable by reducing in a step-by-step manner by means of a plurality of drawing operations a portion of a length of stock of cross sectional area greater than the shank to form the shank and the stem, upsetting the unreduced portion of the stock to form the head, and rolling threads on the stem, said article being characterized by freedom from heading strains and foliated structure in the head and by compactness and denseness of metal in the stem.

9. As a new manufacture, a threaded article comprising a head, a shank and a stem, the shank being of drawn metal reduced from stock of larger diameter, the stem being further drawn and reduced and having a rolled thread thereon and the head being upset from an undrawn portion of the stock, the article being characterized by freedom from heading strains and foliated structure in the head and by compactness and density of the metal in the stem, particularly near the surface.

CHARLES KAUFMAN.